Oct. 11, 1938.   D. W. BOYLAN ET AL   2,133,013
PIPE COATING APPARATUS
Filed Oct. 28, 1936   4 Sheets-Sheet 1
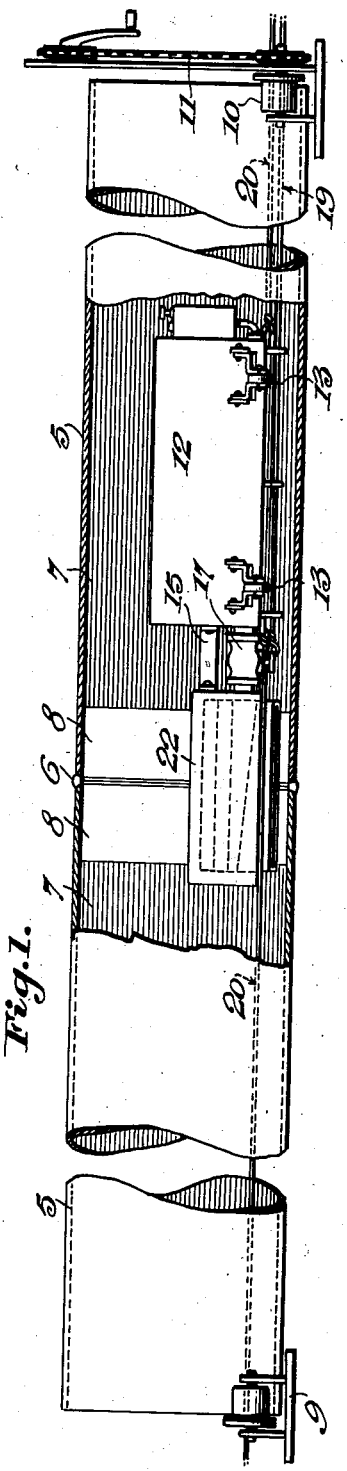
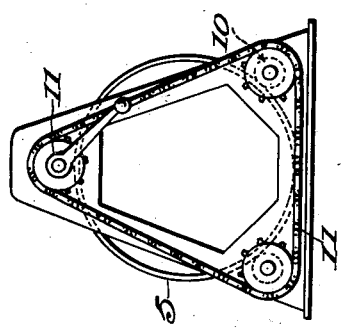
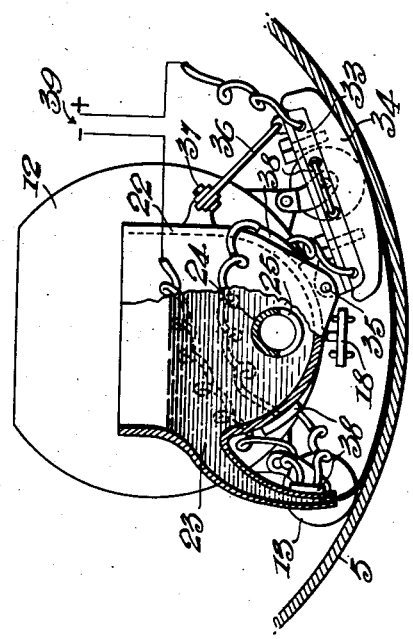
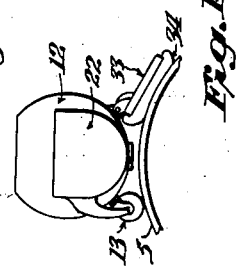
INVENTOR.
David W. Boylan,
Clifford F. Morain
BY
ATTORNEY.

Oct. 11, 1938.　　　D. W. BOYLAN ET AL　　　2,133,013
PIPE COATING APPARATUS
Filed Oct. 28, 1936　　　4 Sheets-Sheet 2
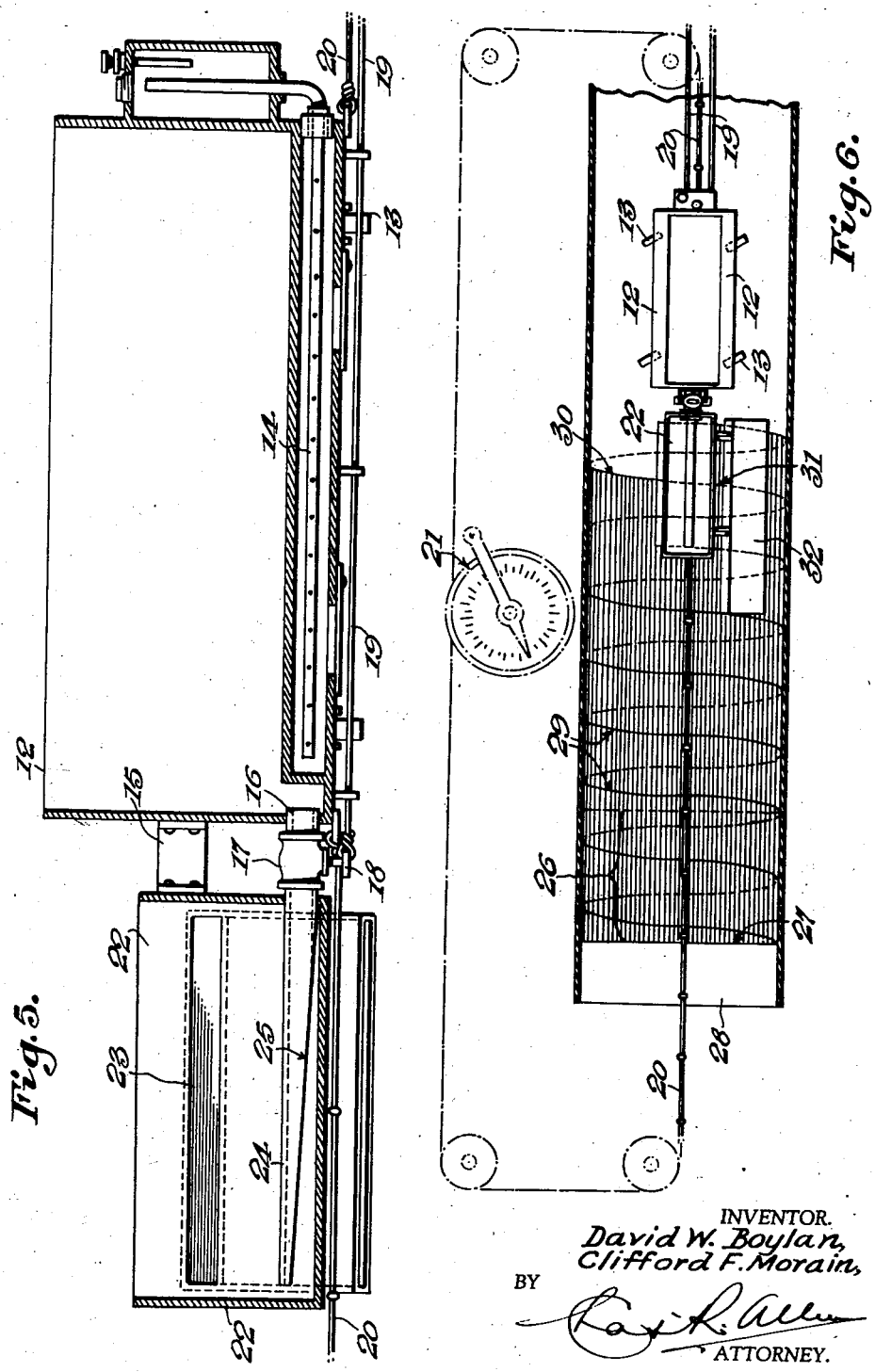
INVENTOR.
David W. Boylan,
Clifford F. Morain,
BY
ATTORNEY.

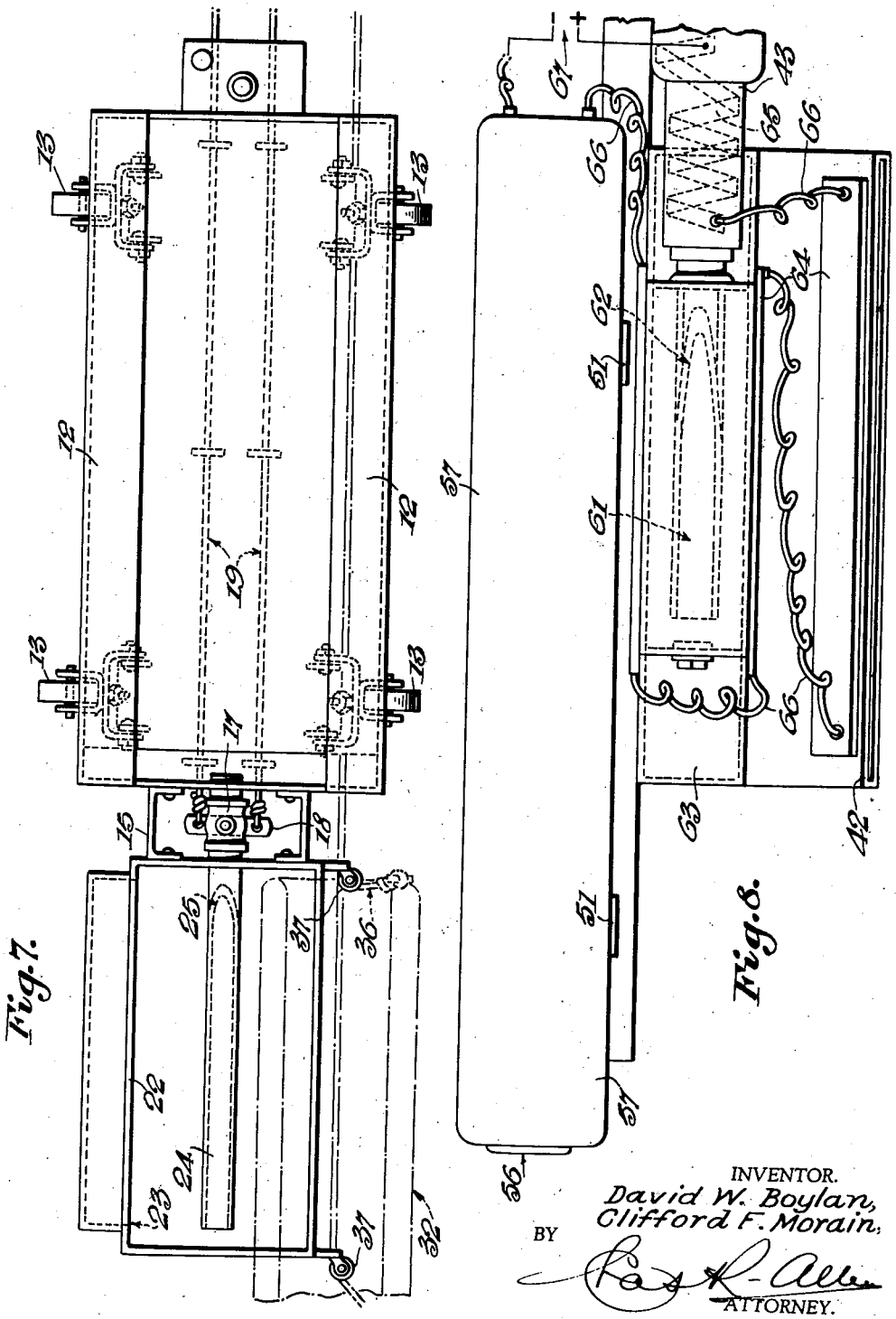

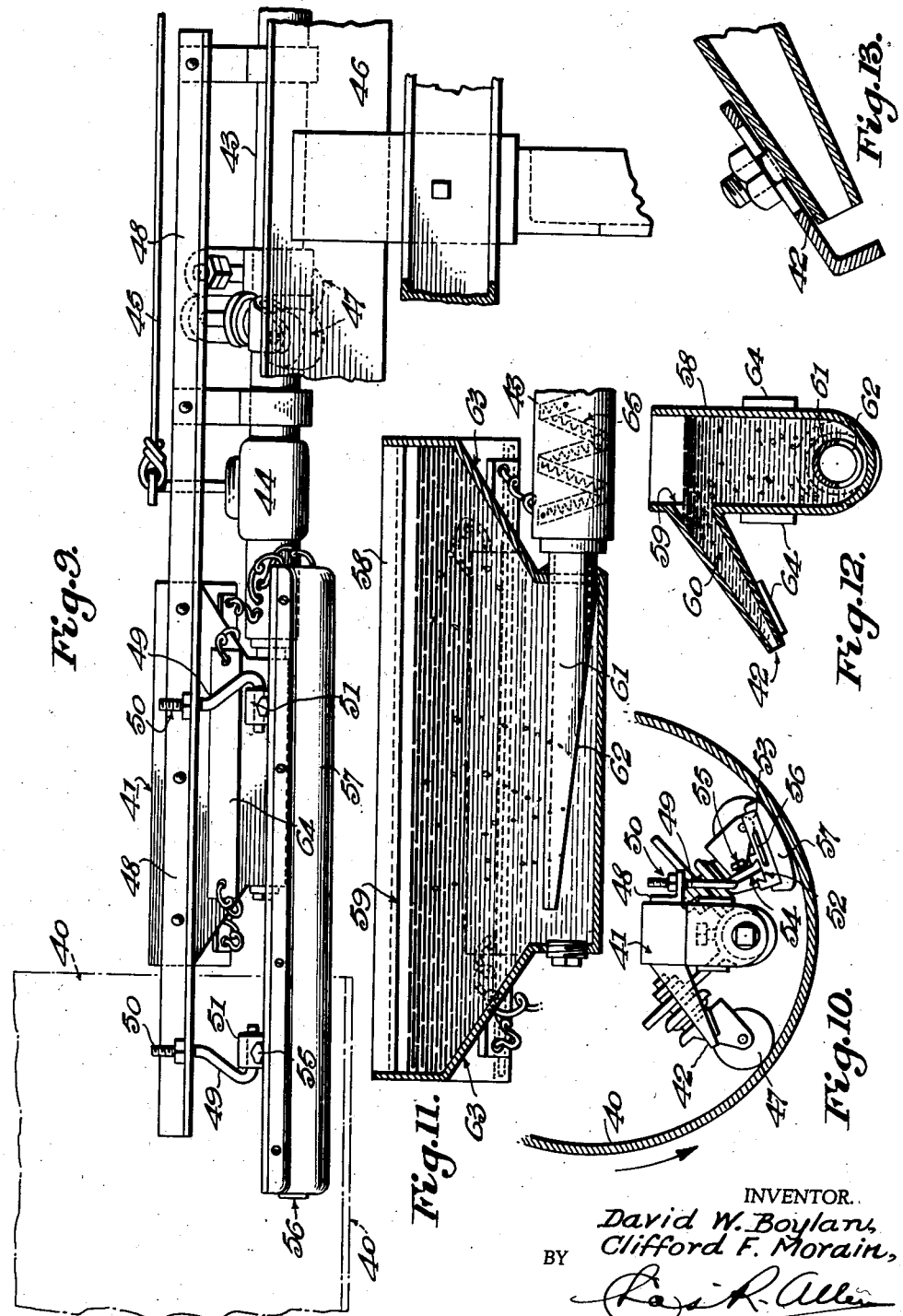

Patented Oct. 11, 1938

2,133,013

UNITED STATES PATENT OFFICE 2,133,013

PIPE COATING APPARATUS

David W. Boylan, San Francisco, Calif., and Clifford F. Morain, Youngstown, Ohio, assignors to General Paint Corporation, San Francisco, Calif., a corporation of Nevada Application October 28, 1936, Serial No. 108,108

20 Claims. (Cl. 91—30)

The invention relates to the art of pipe coating and has for an object to provide novel apparatus by employment of which the coating material may be allowed to flow gently onto the surface-to-be-coated, without force, pressure or turbulence, and while still in its wet or plastic form, smoothed out or ironed so as to entirely eliminate from the applied coating tiny air bubbles, skips or voids, thus assuring against surface imperfections.

It is well known that pipes and tubing formed of known materials are subject to rust and corrosion, and that piping adapted for water conduits, either steel, cast iron or concrete, when used without suitable internal pre-treatment, is subject to the formation of tubercles. Tuberculation is no small factor to be considered by engineers in constructing water lines. Records are available which show that the supply of water to a city can be reduced as much as 10% by reason of the constriction of the internal diameter of the conduit by tubercle formation. According to one popular method of pipe coating the interiors of pipes are given a heavy coating of bituminous enamel which is applied hot and ultimately forms a very smooth lining such as will definitely prevent tuberculation and reduce to a minimum frictional resistance to fluid flow.

Coatings of any nature, internal or external, and particularly hot viscid coatings of the character above alluded to, are subject to air bubble formation, especially where any turbulence is set up incident to the application thereof, and the resultant air pocket formations provide surface imperfections in the finished product. Moreover, when the coating is applied in the form of a helical ribbon, as disclosed in application for Letters Patent, Serial No. 108,105, filed by David W. Boylan on October 28, 1936, there is a tendency to produce a rifled effect.

In its more detailed nature, therefore, the invention has for an object to provide a novel coating applicator structure including an overflow lip or ledge from which the coating material may gently flow onto the surface-to-be-coated, said applicator being constructed in a novel manner and including novel coating material inflow and outflow controlling equipment all constructed and arranged to avoid turbulence in the coating material and for facilitating the elimination of air bubbles.

Another object of the invention is to provide a coating ironer structure and to mount the same in novel correlation with the applicator whereby to engage the coated surface immediately after the coating is applied to press out any air pockets which may have formed therein and to so smooth the surface as to avoid formation of surface imperfections and assure the smooth, unbroken finished appearance desired.

Another object of the invention is to provide means whereby the applicator, the ironer and the means for supplying coating material to the applicator can be heated, preferably to substantially the same temperature.

Another object of the invention is to provide means whereby the relation of the applicator and the ironer may be adjusted.

Another object of the invention is to provide means for adjusting the flow outlet from the applicator.

With the above and other objects in view which will hereinafter appear, the invention further resides in the novel details of construction, combination and arrangement of parts, all of which will be first fully described in the following detailed description, then particularly pointed out in the appended claims, reference being had to the accompanying drawings.

In the drawings:

Figure 1 is a somewhat diagrammatic side elevation illustrating the invention applied to an apparatus for coating pipes in the field, parts being in longitudinal section.

Figure 2 is a left end view.

Figure 3 is a right end elevation.

Figure 4 is an enlarged left end elevation of the apparatus shown in Figure 1 with an ironer applied thereto, parts being broken away and in section.

Figure 5 is a vertical longitudinal section of the apparatus shown in Figure 1.

Figure 6 is a diagrammatic plan view illustrating the apparatus of Figure 4 in use for coating the interior of a pipe, the pipe being shown in horizontal section.

Figure 7 is a plan view of the apparatus shown in Figures 4 and 5.

Figure 8 is an inverted plan view illustrating the invention applied to another form of apparatus peculiarly adapted to the lining of pipes, means for heating the applicator, the ironer and the coating supply means being illustrated somewhat diagrammatically.

Figure 9 is a side elevation of the parts shown in Figure 8.

Figure 10 is a left end view of the parts shown in Figure 9.

Figure 11 is a vertical longitudinal section of the applicator shown in Figure 9.

Figure 12 is a vertical cross section of the applicator shown in Figure 11.

Figure 13 is an enlarged detail vertical cross section illustrating an adjustable lip for the applicator.

Figure 14 is a diagrammatic fragmentary end view illustrating the invention positioned upon an external surface of a pipe.

The invention is adapted to use in various forms of pipe coating apparatus. In this disclosure we have illustrated the adaptation of the invention to two such forms of apparatus, being those disclosed in applications for patent Serial No. 108,110, filed by David W. Boylan, Clifford F. Morain, and Otto R. Bowman on October 28, 1936, and Serial No. 108,106, filed by Clifford F. Morain on October 28, 1936, and each of which is capable of practicing the novel method of pipe coating disclosed in application for patent Serial No. 108,105, filed by David W. Boylan on October 28, 1936.

The apparatus of the first of the applications above mentioned, designed principally for coating pipes in the field, is illustrated in Figures 1 to 7 wherein 5, 5 designate a pair of pipe sections joined by a weld 6. The pre-coated portions of the pipe are indicated at 7, and the annular surfaces, left bare during the original coating to facilitate coupling and to be later coated in the field, are indicated at 8.

At one end the pipe sections are rotatably supported upon a cradle as at 9, and at the other end said sections rest upon a similar cradle equipped with driving rollers 10 and rotation imparting devices generally designated 11.

The coating apparatus comprises the trough-like truck 12 supported upon rollers 13 having mounting devices preferably of the caster type and including provision for adjustment to adapt the apparatus to the coating of pipes of various sizes, internally or externally. See Figures 2 and 14.

One coating material found very effective in the coating or lining of pipes, particularly when they are intended for water conduits, is bituminous enamel. This material produces a smooth hard finish which will reduce to the minimum surface friction and permanently overcomes the tendency toward tubercle formation. It is preferably applied at a temperature approximating 400° and for heating the coating material the truck is equipped with a suitable heating means generally designated 14.

Supported upon the truck in any suitable manner, as at 15, and longitudinally alined therewith, is a coating applicator described in detail hereinafter and which embodies various features of the invention herein claimed. A pipe line 16 affords communication between the truck and the applicator, and in this line a valve 17 is provided for controlling said communication. The valve 17 is equipped with a cross handle 18 to which cords 19 are attached and lead out of the pipe sections whereby to enable remote control of the flow of coating material into and from the applicator.

Pull cords 20 and windlass equipment 21 associated with suitable position indicating devices may be provided, as diagrammatically indicated in Figure 6, or any other suitable applicator moving and position indicating means may be employed.

The novel applicator is in the nature of an open trough-like body 22 equipped, at a high point along one side thereof, with an overflow opening 23 delivering into an applicator spout terminating in a lip which preferably extends to a point adjacent the surface-to-be-coated as shown in Figure 4. As will be observed by reference to Figure 4 of the drawings, the walls forming the spout converge toward the lip to form a gradual constriction.

By reason of the provision of the gradual constriction in the spout, a sort of squeezing or pressure exertion takes place during the outflowing of the hot, viscid coating material which tends to eliminate therefrom any air bubbles which may have become entrapped therein, and since the entrance into the spout is disposed adjacent the open top of the applicator body the air thus eliminated from the outpouring mass may readily pass out into the surrounding atmosphere.

It will be noted by reference to Figures 5 and 7 that the delivery pipe 16 extends a considerable distance into the lower portion of the applicator as indicated at 24, and that the lower portion or wall of the pipe is angularly removed to provide a long, gradually widening outflow opening 25 designed to introduce the coating material without turbulence. Obviously to suddenly release or force the material into the applicator, as by employment of a restricted outlet, or one cut off abruptly, would set up a turbulence which we avoid and which would be conducive to air bubble formation. Moreover, the provision of the novel outlet at the bottom of the applicator, and the outflow opening 23 adjacent the open top, any air bubbles entering at the low point would be pressed out by the weight of the viscid mass and, rising in the hot liquid, would quickly gain momentum and pass out at the top of the mass without entering the spout.

When it is desired to coat the whole of the interior of the pipe, as distinguished from coating only the bare spaces 8, it is possible to hold the applicator in one position during one or more revolutions of the pipe so as to provide a transverse annular ribbon indicated at 26, and when this ribbon is formed inwardly of the end of the pipe the desired transverse cut off 27 will be provided leaving a bare space 28 similar to those shown at 8 in Figure 1. After completion of the transverse ribbon 26 the applicator may be moved longitudinally within the rotating pipe so as to lay a helical ribbon, the individual helices being so pitched as to overlap or shingle as at 29 with the ribbon centered on the terminal edge 30 of each previously laid helix as indicated at 31. See Figure 6. This method of pipe coating is fully disclosed in the method application for patent hereinbefore referred to.

When working with hot bituminous enamel, as hereinbefore stated, it is desirable to iron out or apply pressure to the coated surface so as to smooth the same and remove therefrom all air bubbles such as might tend to provide surface imperfections. For this purpose an ironer generally designated 32 may be employed. See Figures 2, 4, 5 and 7. An efficient ironer suitable for this purpose is disclosed and claimed in application for patent Serial No. 108,107, filed by David W. Boylan on October 28, 1936, and no claim to the ironer per se is made herein. In this disclosure the ironer is generally shown as including a carrier 33 and a shoe 34 removably secured thereto, thus adapting the ironer for contact with the interior or exterior of pipe sections as illustrated in Figures 2, 4 and 14 of the drawings. The ironer may be pivotally secured as at 35 to the applicator, and suitable lift cords 36 may be provided, being attached to the carrier 33 and passing over pulleys 37 secured to the applicator and thence out of the end of the pipe where they may be manipulated to lift the ironer off the coated surface or lower the same onto said surface whenever desired. Suitable heating devices, preferably resistance heaters generally designated 38, are secured to the applicator, the lip thereof and the ironer, as indicated in Figure 4, and are connected to a suitable source of current as indicated diagrammatically at 39, thus making it possible to heat the flowing coating material and the ironing device to substantially the same temperature.

In Figures 8 to 13 we have shown the invention applied to the second form of apparatus mentioned as adapted for practicing the method of pipe coating hereinbefore referred to. In these figures the pipe-to-be-coated is indicated at 40, the coating applicator at 41, and the applicator lip from which the hot bituminous coating material flows in a velvety ribbon at 42. In this form of apparatus the coating applicator is carried at the end of a pipe or conduit 43 from which the coating material flows into the applicator through a control valve 44, means in the form of pull cables 45 being provided so that the control valve may be actuated from a remote point.

The conduit 43 and the applicator 41 supplied therefrom are supported for longitudinal travel back and forth by trackways 46, suitable casters 47 being secured to the conduit in position to ride upon said trackways. It should be understood that the trackways 46 form the normal support for the traveling applicator, but when said applicator is projected into the interior of the pipe-to-be-coated, the casters 47 ride over the internal surface of the pipe as illustrated in Figure 10, they being free to adapt themselves to the relative directions of travel of the pipe and applicator parts at any given time.

It will be observed by reference to Figures 9 and 10, that an angle iron or support bar 48 is secured to the conduit 43 in any suitable manner as indicated so as to aid in supporting the applicator 41 and provide a support for a pair of hanger rods 49 which are vertically-adjustably suspended from the member 48 as indicated at 50.

The hanger rods are shaped to provide horizontal portions which are receivable in bores provided in the mounting lugs or ears 51 which project from the coating ironer mounted in cooperative relation with the applicator. The lugs 51 include dovetail end portions which are slidably adjustable as to position in a longitudinal dovetail groove 52 formed in the carrier portion 53 of the ironer. See Figures 9 and 10. Each of the lugs 51 is split as at 54 and equipped with a set screw 55 effective when it is screwed home to spread the dovetail end of the lug and secure it in its adjusted position in the slotway 52. By this means it is possible to adjust the ironer longitudinally upon the hanger rods 49, and by utilizing the adjustable connections 50, it is possible to adjust the ironer vertically with respect to the supporting member 48.

The ironer shown in this form of the invention forms the subject matter of a separate application for patent hereinbefore referred to and, as disclosed in that application, embodies a heater unit of approved construction generally indicated 56 and through the medium of which heat may be applied to the ironer.

As has been hereinbefore stated, selective shoes 57 may be attached to the carrier portion 53 of the ironer so as to adapt it for use in internal or external coating. The edge portions of the ironer are well-rounded so as to assure against throwing up a wave of coating material in advance of the ironer and likewise to avoid any tendency to rifle the coating. It may be found desirable also to mount the ironer, by utilization of the hanger adjustments 50, to position the leading end of the ironer slightly higher than the trailing end as illustrated and described in the separate application for patent hereinbefore referred to.

In this form of the invention as in the form previously described, provision is made for eliminating turbulence and air bubble accumulation resulting from this or other causes. In its specific construction the applicator is in the form of an open trough-like body 58 having a longitudinal outlet 59 in one wall thereof adjacent the top edge and which delivers the coating material into the delivery spout 60 projecting laterally from one wall of the applicator and which is gradually constricted from its entrance 59 down to the delivery lip 42 in the manner illustrated in Figure 12 of the drawings and for the purpose of air bubble elimination hereinbefore described.

The delivery pipe 61 forming a continuation of the pipe line 43 is extended into and along the bottom of the applicator, as indicated in Figures 8 and 11, and the lower portion thereof is angularly cut out as at 62 so as to assure introduction of the coating material into the applicator without turbulence after the manner hereinbefore described in detail. To further assure elimination of air bubbles in the hot, viscid mass of coating material, the end walls of the applicator are flared as at 63 to facilitate rapid expulsion of any air bubbles which may be formed.

In order to provide for the proper heating of the supply pipe line 43, the applicator generally designated 41, including the discharge lip thereof, and the ironer 57, the applicator has affixed thereto a number of suitably placed strip heaters 64, preferably of the resistance type. The pipe line 43 is equipped with a similar heater 65 which may be coiled spirally thereabout, and the heaters 64 and 65 are connected together and with the heater 56 of the ironer in the manner generally indicated at 66, and with a suitable source of electrical energy diagrammatically illustrated at 67.

By properly moving the particular form of applicator along the pipe surface in the manner described in the applications for patents hereinbefore referred to, and while the pipe is being rotated, a thick velvety ribbon of hot bituminous enamel will flow from the applicator and be applied to the pipe surface in the manner hereinbefore described.

In practice, the discharge lip of the applicator preferably is 20 to 24 inches in length so that the coating material, flowing gently from said lip, will be deposited on the pipe surface in the form of a thick velvety ribbon of hot bituminous enamel 20 to 24 inches wide. When the coating method is carried out in accordance with the disclosure in the method application hereinbefore referred to, the applicator is drawn along the pipe surface a distance just half the width of the ribbon or from 10 to 12 inches for each revolution of the pipe as indicated in Figure 6. The principle of flowing on the coating material without force, pressure, or turbulence, does much toward entirely eliminating tiny air bubbles, skips or voids, and the use of the ironer, mounted in cooperative relation with the applicator as hereinbefore described, greatly facilitates this elimination and assures against surface imperfections.

The ironer preferably is from 30 to 36 inches long, or half again as long as the applicator lip is wide. Thus from an applicator lip 24 inches long and traveling longitudinally 12 inches for each revolution of the pipe, a 24 inch helical ribbon will be laid during a given first revolution of a pipe. This will be ironed out or pressed by the following ironer. At the next revolution another 24 inch ribbon helix will be laid, one half of the width thereof being shingled over the previously laid helix, and this second application will again be ironed out. As the device travels forward another 12 inches the ironer will pass over the completed coating a third time because of the fact that it projects approximately 12 inches to the rear of the applicator lip as indicated in Figures 6, 8 and 9 of the drawings.

It is of course to be understood that the details of structure and arrangement of parts may be variously changed and modified without departing from the spirit and scope of our invention.

We claim:

1. In pipe coating apparatus, a mobile coating applicator comprising a container body having a longitudinal overflow opening, an applicator lip over which coating material flows from said opening for gentle deposition onto the surface of the pipe-to-be-coated, and means to introduce coating material into the applicator by a gradual release of pressure to avoid turbulence.

2. In pipe coating apparatus, a mobile coating applicator comprising a longitudinal open container body having an overflow opening disposed at a high point along one side thereof, an applicator lip over which coating material flows from said opening for gentle deposition onto the surface of the pipe-to-be-coated, and means disposed at a low point in said body for introducing coating material thereinto by a gradual release of pressure to avoid turbulence.

3. In pipe coating apparatus, a mobile coating applicator comprising a longitudinal open container body having an overflow opening disposed along one side thereof in a direction paralleling the axis of a pipe being coated, and a spout into which said opening delivers having an outlet lip likewise paralleling the axis of a pipe being coated and over which coating material flows for gentle deposition onto the surface of a pipe being coated and being formed of walls which converge gradually from said opening to said lip whereby to form an air bubble eliminating constriction.

4. In pipe coating apparatus, a mobile coating applicator comprising a longitudinal open container body having an overflow opening disposed along one side thereof, and a spout into which said opening delivers having an outlet lip over which coating material flows for gentle deposition onto the surface of the pipe-to-be-coated and being formed of walls which converge gradually from said opening to said lip whereby to form an air bubble eliminating constriction, and means to introduce coating into the applicator by a gradual release of pressure to avoid turbulence.

5. In pipe coating apparatus, a mobile coating applicator comprising a longitudinal open container body having an overflow opening disposed at a high point along one side thereof, and a spout into which said opening delivers having an outlet lip over which coating material flows for gentle deposition onto the surface of the pipe-to-be-coated and being formed of walls which converge gradually from said opening to said lip whereby to form an air bubble eliminating constriction, and means disposed at a low point in said body for introducing coating material thereinto.

6. In pipe coating apparatus, a mobile coating applicator comprising a container including wall portions defining a trough-like body and having a longitudinal overflow opening, an applicator lip over which coating material flows from said opening for gentle deposition onto the surface of the pipe-to-be-coated, and means to introduce coating material into the applicator by a gradual release of pressure to avoid turbulence, at least one wall portion of said body being flared adjacent said opening to increase the volumetric capacity of the body and facilitate air bubble elimination.

7. In pipe coating apparatus, a mobile coating applicator comprising a container including wall portions defining a longitudinal open trough-like body and having an overflow opening disposed at a high point along one side thereof, and a spout into which said opening delivers having an outlet lip over which coating material flows for gentle deposition onto the surface of the pipe-to-be-coated and being formed of walls which converge gradually from said opening to said lip whereby to form an air bubble eliminating constriction, and means disposed at a low point in said body for introducing coating material thereinto, at least one wall portion of said body being flared adjacent said opening to increase the volumetric capacity of the body and facilitate air bubble elimination.

8. In pipe coating apparatus, a mobile coating applicator comprising a container body having a longitudinal overflow opening, an applicator lip over which coating material flows from said opening for gentle deposition onto the surface of the pipe-to-be-coated, means to introduce coating material into the applicator by a gradual release of pressure to avoid turbulence, and means for applying heat to said body and said lip.

9. In pipe coating apparatus, a mobile coating applicator comprising a container body having a longitudinal overflow opening, an applicator lip over which coating material flows from said opening for gentle deposition onto the surface of the pipe-to-be-coated, means to supply coating material and introduce the same into the applicator, and means for applying heat to said supply means, said body and said lip.

10. A coating material applicator comprising an open trough-like body having a longitudinal overflow opening at a high point along one side thereof, a delivery spout into which said opening delivers and defined by gradually converging walls to terminate in a constricted lip from which the coating flows gently onto the surface-to-be-coated, and a coating material introducing pipe extending into and along the bottom of said body and having formed therein a longitudinal delivery opening of gradually increased size.

11. A coating material applicator comprising an open trough-like body having a longitudinal overflow opening at a high point along one side thereof, a delivery spout into which said opening delivers and defined by gradually converging walls to terminate in a constricted lip from which the coating flows gently onto the surface-to-be-coated, and a coating material introducing pipe extending into and along the bottom of said body and having formed therein a longitudinal delivery opening of gradually increased size, walls of said body being flared outwardly adjacent said overflow opening.

12. A coating material applicator comprising an open trough-like body having a longitudinal overflow opening at a high point along one side thereof, a delivery spout into which said opening delivers and defined by gradually converging walls to terminate in a constricted lip from which the coating flows gently onto the surface-to-be-coated, a coating material introducing pipe extending into and along the bottom of said body and having formed therein a longitudinal delivery opening of gradually increased size, walls of said body being flared outwardly adjacent said overflow opening, and means to apply heat to said pipe, said body, and said spout.

13. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, and a coating ironer half again as long as said lip and supported in fixed relation to said lip for ironing out the coating just after it flows therefrom.

14. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, a longitudinal coating ironer supported in fixed relation to said lip for ironing out the coating just after it flows therefrom, and means for mounting said ironer to permit longitudinal adjustment thereof relative to said lip.

15. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, a longitudinal coating ironer supported in fixed relation to said lip for ironing out the coating just after it flows therefrom, and means for mounting said ironer to permit longitudinal and vertical adjustment thereof relative to said lip.

16. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, a longitudinal coating ironer supported in fixed relation to said lip for ironing out the coating just after it flows therefrom, and means for mounting said ironer to permit longitudinal and individual vertical end adjustments thereof relative to said lip.

17. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, a coating ironer associated with said applicator for ironing out the coating just after it flows from said lip, and means for heating the applicator and the ironer.

18. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, a coating ironer associated with said applicator for ironing out the coating just after it flows from said lip, and means for heating the applicator and the ironer to substantially the same temperature.

19. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, a coating ironer supported in fixed relation to said lip and approximately half again as long as said lip whereby to extend half a length beyond said lip at one end, and means for heating said applicator and said ironer.

20. In a pipe coating machine, the combination of a coating applicator comprising a longitudinal mobile container body having a longitudinal overflow opening and an applicator lip over which coating material flows from said opening for gentle deposition onto the surface of the pipe-to-be-coated, a coating ironer supported in fixed relation to said lip and approximately half again as long as said lip whereby to extend half a length beyond said lip at one end, means for adjustably supporting said ironer for longitudinal and independent vertical end adjustment relative to said lip, and means for applying heat to said body, said lip and said ironer.

DAVID W. BOYLAN.
CLIFFORD F. MORAIN.